United States Patent
Feger et al.

(10) Patent No.: US 8,854,264 B2
(45) Date of Patent: Oct. 7, 2014

(54) TWO-DIMENSIONAL ANTENNA ARRAYS FOR BEAMFORMING APPLICATIONS

(75) Inventors: Reinhard Feger, Scheffau (AT); Stefan Scheiblhofer, Linz (AT); Christoph Wagner, Enns (AT); Christian Michael Schmid, Linz (AT); Andreas Stelzer, Linz (AT); Erich Kolmhofer, Linz (AT); Ziqiang Tong, Linz (AT)

(73) Assignee: Infineon Technologies AG, Neubiberg (DE)

( * ) Notice: Subject to any disclaimer, the term of this patent is extended or adjusted under 35 U.S.C. 154(b) by 445 days.

(21) Appl. No.: 13/214,586

(22) Filed: Aug. 22, 2011

(65) Prior Publication Data
US 2013/0050022 A1  Feb. 28, 2013

(51) Int. Cl.
   *H01Q 1/38*   (2006.01)
   *H01Q 9/04*   (2006.01)
   *H01Q 21/24*  (2006.01)
   *H01Q 21/06*  (2006.01)
   *H01Q 21/08*  (2006.01)
   *G01S 13/02*  (2006.01)

(52) U.S. Cl.
   CPC .......... *H01Q 21/065* (2013.01); *H01Q 9/0407* (2013.01); *H01Q 21/24* (2013.01); *H01Q 21/08* (2013.01); *G01S 2013/0245* (2013.01)
   USPC .................................... 343/700 MS; 343/893

(58) Field of Classification Search
   USPC ................... 343/700 MS, 702, 893
   See application file for complete search history.

(56) References Cited

U.S. PATENT DOCUMENTS

| | | | | |
|---|---|---|---|---|
| 5,510,803 | A * | 4/1996 | Ishizaka et al. | 343/700 MS |
| 6,320,542 | B1 * | 11/2001 | Yamamoto et al. | 343/700 MS |
| 6,320,544 | B1 * | 11/2001 | Korisch et al. | 343/700 MS |
| 6,384,787 | B1 * | 5/2002 | Kim et al. | 343/700 MS |
| 2009/0278746 | A1 * | 11/2009 | Aurinsalo et al. | 343/700 MS |

FOREIGN PATENT DOCUMENTS

| | | |
|---|---|---|
| DE | 10 2006 024 457 A1 | 12/2007 |
| EP | 2 296 007 A1 | 3/2011 |

OTHER PUBLICATIONS

Balanis, Arrays: Linear, Planar and Circular, Planar Array, pp. 349-364, © 2005, 3rd edition, Publisher: Wiley-Interscience.
Balanis, Microstrip Antennas, Rectangular Patch, pp. 816-868, © 2005, 3rd edition, Publisher: Wiley-Interscience.
Tong et al., 77 *GHz Center-Fed Differential Microstrip Antenna Array*, Proceedings of the 5th European Conference on Antennas and Propagation (EUCAP), pp. 583-586.

\* cited by examiner

*Primary Examiner* — Tan Ho
(74) *Attorney, Agent, or Firm* — Patterson Thuente Pedersen, P.A.

(57) ABSTRACT

Embodiments relate to two-dimensional antenna arrays. In one embodiment, an antenna array includes single-ended fed patch antennas and differentially fed patches. Field polarization of the radiated and/or received EM waves is different by 90 degrees for each different antenna type. Thus, an aligned polarization pattern can be achieved using orthogonal feeding direction for single-ended and differential patches. Embodiments can be used in radar or virtually any other 2D array antenna system.

19 Claims, 1 Drawing Sheet

TWO-DIMENSIONAL ANTENNA ARRAYS FOR BEAMFORMING APPLICATIONS

TECHNICAL FIELD

The invention relates generally to radar systems and more particularly to efficient two-dimensional antenna arrays for beamforming applications.

BACKGROUND

Radar technology for object detection and ranging is well established in high-end military applications but has recently had increasing impact in commercial and industrial equipment. The design of multi-channel radar systems used in combination with phased array transmitters and beamforming signal processing enable resolution of a large number of targets at different angles, even if the targets are located at the same range. The design of the antenna system in such a configuration, particularly for three-dimensional measurement applications that require the radar unit to scan the field of view in the horizontal as well as the vertical dimension, is challenging.

Low-cost applications commonly apply planar patch antenna arrays, such as two-dimensional (2D) uniform planar arrays or circular configurations. The antenna elements (or patches), which are placed in a certain uniform or nonuniform structure in two dimensions, radiate and/or receive the electromagnetic (EM) signal generated by the radar frontend to freespace with a certain polarization of the EM wave. Broadband radar systems, which use a large EM signal bandwidth to achieve high accuracy, commonly use so-called linear polarized antenna elements, with the polarization direction depending on the patch type, feeding point, and angular rotation of the patch on the substrate material. These antennas are commonly fabricated on multi-layer printed circuit boards (PCBs).

For proper operation of the radar unit, it typically is required that the polarization direction of all antenna elements, transmitters as well as receivers, is geometrically aligned, since a mismatch of the polarization plane results in signal loss and therefore reduced system performance. Circular polarized antenna elements, which are not sensitive on the rotation angle, often cannot be used since the bandwidth of this latter antenna type is very limited.

As a second problem, depending on the array type, the single antenna elements have to be closely spaced, e.g. by half a wavelength of the transmitted EM signal in conventional uniform rectangular planar arrays.

Thus, there are many challenges in designing planar arrays, including placing the antenna elements in closely spaced positions; aligning the antennas to achieve similar EM field polarization of the individual patches; and feeding the antenna elements from the radio frequency (RF) frontend, avoiding feed line intersections. Contradictions appear in trying to meet all of these requirements simultaneously and often strictly limit the practically realizable configurations for array design.

A conventional solution to the above challenges applies a so-called "backside"-feed to the patch elements. In this case, the antenna elements, which are located on the top layer of the antenna PCB, are fed from the back, either from a waveguide feeding structure or a conventional buried transmission line based approach on an inner PCB layer. Waveguide feeds, although being optimum regarding losses, are bulky and very expensive in fabrication. Buried transmission lines, on the other hand, are inexpensive to fabricate but introduce higher losses especially at high operating frequencies (without a separate layer of expensive substrate materials).

If feeding lines on the PCB's top layer are used, the orientation of the patches and the location of the feeding point must match. One solution to achieve this in a closely spaced two-dimensional L-shaped array is to use a 45-degree orientation of the patches. This in turn reduces the spacing of the antenna elements and therefore leads to stronger coupling effects, which is disadvantageous for the overall array performance.

Therefore, there is a need for improved radar antenna arrays.

SUMMARY

Embodiments relate to two-dimensional antenna arrays.

In an embodiment, a two-dimensional antenna array comprises at least one differential patch antenna element arranged along a first axis and having an E-plane polarization direction parallel with the first axis; and at least one single-ended fed patch antenna element arranged along a second axis orthogonal to the first axis and having an E-plane polarization direction parallel with the first axis.

In an embodiment, an antenna array comprises at least one antenna element arranged along a first axis and having an E-plane polarization direction parallel with the first axis and a feed line arranged perpendicular to the first axis; and at least one antenna element arranged along a second axis perpendicular to the first axis and having an E-plane polarization direction and a feed line arranged parallel with the first axis.

In an embodiment, a method comprises arranging at least one antenna element of a first type along a first axis such that an E-plane polarization direction of the at least one antenna element of the first type is parallel with the first axis; and arranging at least one antenna element of a second type different from the first type along a second axis such that an E-plane polarization direction of the at least one antenna element of the second type is parallel with the first axis.

BRIEF DESCRIPTION OF THE DRAWINGS

The invention may be more completely understood in consideration of the following detailed description of various embodiments of the invention in connection with the accompanying drawings, in which.

Figure 1:
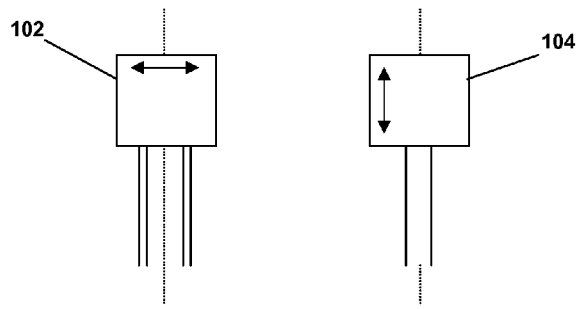
FIG. 1 is a diagram of patch antennas according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to efficient two-dimensional antenna arrays for beamforming applications. In one embodiment, an antenna array comprises single-ended fed patch antennas and differentially fed patches. Field polarization of the radiated and/or received EM waves is different by 90 degrees for each different antenna type. Thus, an aligned polarization pattern can be achieved using orthogonal feeding direction for single-ended and differential patches. Embodiments can be used in radar or virtually any other 2D array antenna system.

Referring to FIG. 1, radiating patch antenna elements 102 and 104 are depicted. Patch antenna element 102 is a differentially fed single patch antenna, and patch antenna 104 is a single-ended fed single patch antenna. The far field polarization direction of the E-plane for each antenna 102 and 104 is indicated by double-ended arrow. The directions between the two antennas 102 and 104 are orthogonal due to the different feeding structures.

Figure 2:
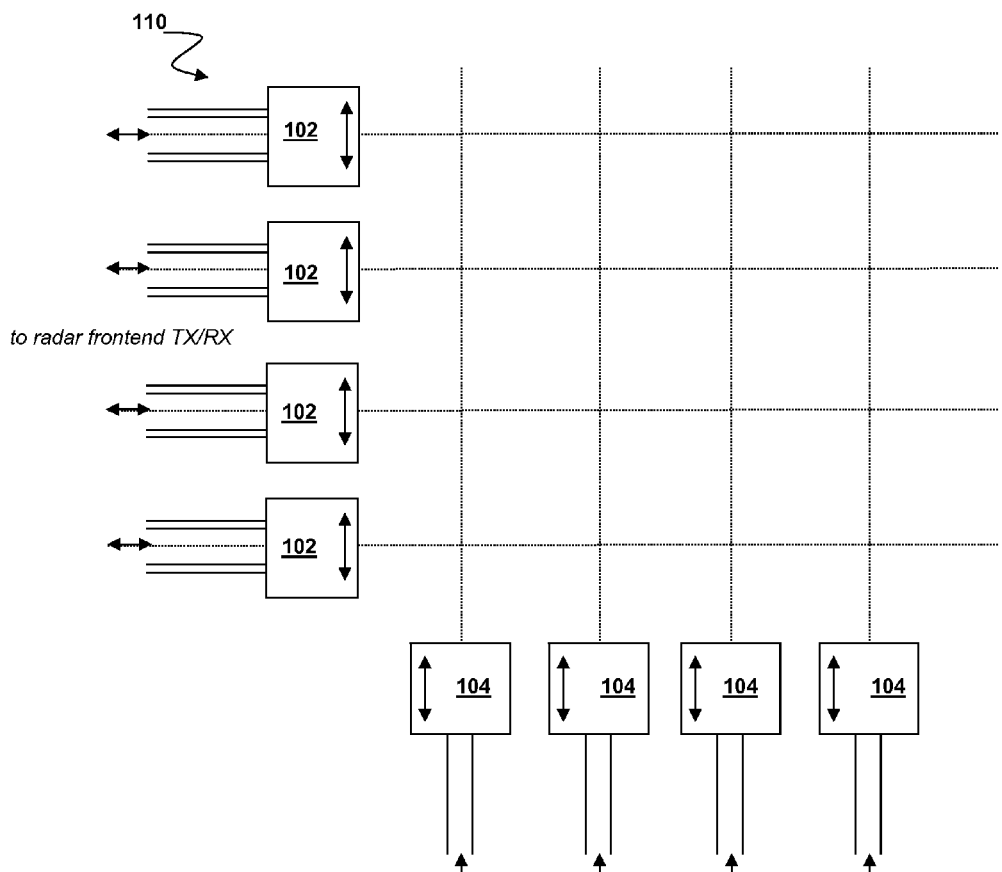
FIG. 2 is a diagram of a two-dimensional patch antenna array according to an embodiment.

Referring to FIG. 2, patch antenna elements 102 and 104 can be configured in a two-dimensional (2D) planar array 110. In the embodiment of FIG. 2, array 110 is L-shaped and comprises four antenna elements 102, 104 in each antenna direction, with single-ended fed patch antennas (104) arranged in the horizontal dimension and differentially fed patch antennas (102) arranged in the vertical. Other embodiments can comprise more or fewer patch antennas and/or other two-dimensional layouts. The orthogonally oriented feeding points of patch antenna elements 102 and 104 at the patch edges provide a consistent polarization of the radiated and/or received EM wave, as depicted by the double-ended arrows. Array 110 enables use of simple feeding networks even for closely spaced antennas.

Unlike conventional solutions, no backside-feed is necessary. In array 110, antenna elements 102 and 104 can each be fed from the layer of the PCB in which they are mounted.

Embodiments are not limited to simple single patch antennas. In other embodiments, complementary antenna structures with orthogonal feeding points in relation to the EM field polarization can be used. Further, embodiments can also be implemented having bends in the feeding lines, though such embodiments can have increased losses.

Embodiments have applicability to radar and other 2D array antenna systems. Examples include automotive, and azimuth and elevation applications, among others appreciate by those skilled in the art.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A two-dimensional antenna array comprising:
   at least one differential patch antenna element arranged along a first axis and having an E-plane polarization direction parallel with the first axis; and
   at least one single-ended fed patch antenna element arranged along a second axis orthogonal to the first axis and having an E-plane polarization direction parallel with the first axis.

2. The array of claim 1, wherein the at least one differential patch antenna element and the at least one single-ended led patch antenna element are mounted on a first layer of a printed circuit board (PCB).

3. The array of claim 2, wherein a feed line of each of the at least one differential patch antenna element and the at least one single-ended fed patch antenna element are arranged on the first layer of the PCB.

4. The array of claim 1, further comprising a plurality of differential patch antenna elements and a plurality of single-ended fed patch antenna elements.

5. An antenna array comprising:
   at least one antenna element arranged along a first axis and having an E-plane polarization direction parallel with the first axis and a feed line arranged perpendicular to the first axis; and
   at least one antenna element arranged along a second axis perpendicular to the first axis and having an E-plane polarization direction and a feed line arranged parallel with the first axis.

6. The array of claim 5, wherein the at least one antenna element arranged along the first axis comprises a differential antenna element.

7. The array of claim 5, where the at least one antenna element arranged along the second axis comprises a single-ended fed antenna element.

8. The array of claim 5, wherein the antenna elements comprise patch antenna elements.

9. The array of claim 5, wherein the antenna elements are arranged on a layer of a printed circuit board (PCB).

10. The array of claim 9, wherein the feed lines of the antenna elements are arranged on the layer of the PCB.

11. The array of claim 5, further comprising a plurality of antenna elements arranged long the first axis and at plurality of antenna elements arranged along the second axis.

12. A method comprising:
   arranging at least one antenna element of a first type along a first axis such that an E-plane polarization direction of the at least one antenna element of the first type is parallel with the first axis; and
   arranging at least one antenna element of a second type along a second axis such that an E-plane polarization direction of the at least one antenna element of the second type is parallel with the first axis,
   wherein the at least one antenna element of the first type comprises at least one single-ended fed patch antenna element, and wherein the second type is different from the first type.

13. The method of claim 12, wherein the second type comprises at least one differentially fed patch antenna element.

14. The method of claim 12, further comprising arranging the at least one antenna element of the first type and the at least one antenna element of the second type on a first layer of a printed circuit board (PCB).

15. The method of claim 14, wherein arranging at least one antenna element of a first type comprises arranging a feed line of the at least one antenna element of the first type in a first direction relative to the first axis on the first layer of the PCB, and wherein arranging at least one antenna element of a second type comprises arranging a feed line of the at least one antenna element of the second type in a second direction relative to the first axis on the first layer of the PCB, wherein the first direction is one of perpendicular or parallel to the first axis and the second direction is the other of perpendicular or parallel to the first axis.

16. The method of claim 12, further comprising transmitting a signal by an array formed by the at least one antenna element of the first type and the at least one antenna element of the second type.

17. The method of claim 12, further comprising receiving a signal by an array formed by the at least one antenna element of the first type and the at least one antenna element of the second type.

18. A method comprising:
arranging at least one antenna element of a first type along a first axis such that an E-plane polarization direction of the at least one antenna element of the first type is parallel with the first axis, wherein a feed line of the at least one antenna element of the first type is perpendicular to the first axis on a first layer of a printed circuit board (PCB); and
arranging at least one antenna element of a second type different from the first type along a second axis such that an E-plane polarization direction of the at least one antenna element of the second type is parallel with the first axis, wherein a feed line of the at least one antenna element of the second type is parallel with the first axis on the first layer of the PCB.

19. The method of claim 18, wherein the at least one antenna element of the first type comprises one of a single-ended fed patch antenna element or a differential patch antenna element, and wherein the at least one antenna element of the second type comprises the other one of a single-ended fed patch antenna element or a differential patch antenna element.

* * * * *